US012758060B2

(12) United States Patent
Jackson et al.

(10) Patent No.: US 12,758,060 B2
(45) Date of Patent: Oct. 13, 2026

(54) DISPERSIBLE WIPES REINFORCED WITH A BINDING AGENT

(71) Applicant: WIPEFLUSH LTD., Rishon LeZion (IL)

(72) Inventors: David Martin Jackson, Alpharetta, GA (US); Chris Luettgen, Roswell, GA (US); Moshe Toprovsky, Rishon LeZion (IL)

(73) Assignee: WIPEFLUSH LTD., Rishon LeZion (IL)

(*) Notice: Subject to any disclaimer, the term of this patent is extended or adjusted under 35 U.S.C. 154(b) by 619 days.

(21) Appl. No.: 17/458,636

(22) Filed: Aug. 27, 2021

(65) Prior Publication Data

US 2021/0386251 A1 Dec. 16, 2021

Related U.S. Application Data

(63) Continuation of application No. PCT/IL2020/050217, filed on Feb. 26, 2020, which is (Continued)

(51) Int. Cl.

| | |
|---|---|
| ***A47K 10/16*** | (2006.01) |
| ***A47K 10/32*** | (2006.01) |
| ***A47L 13/17*** | (2006.01) |
| ***C11D 17/04*** | (2006.01) |
| ***D04H 1/425*** | (2012.01) |

(Continued)

(52) U.S. Cl.

CPC .............. *A47K 10/16* (2013.01); *A47L 13/17* (2013.01); *C11D 17/049* (2013.01); *D04H 1/425* (2013.01); *D04H 1/587* (2013.01); *D04H 1/732* (2013.01); *D21H 27/002* (2013.01); *A47K 2010/3266* (2013.01); *D10B 2401/024* (2013.01); *D10B 2509/00* (2013.01)

(58) Field of Classification Search

None

See application file for complete search history.

(56) References Cited

U.S. PATENT DOCUMENTS

2003/0000665 A1 1/2003 Takai et al.
2003/0008591 A1 1/2003 Parsons et al.
(Continued)

FOREIGN PATENT DOCUMENTS

EP 2781652 9/2014
JP 4124938 7/2008
(Continued)

OTHER PUBLICATIONS

Guidelines for Assessing Flushability of Disposable Nonwoven Products, published by Inda and Edana; Edition 4, May 2018.
(Continued)

*Primary Examiner* — Arti Singh-Pandey
(74) *Attorney, Agent, or Firm* — PEARL COHEN LLP

(57) ABSTRACT

Disclosed is a wet wipe, for example, a dispersible wet wipe. The wet wipe may include a base sheet comprising short length fibers; a dispersible binding agent reinforcing the base sheet; and a wetting lotion. The dispersible binding agent may be configured to bind the fibers of the base sheet when the dispersible wipe includes liquid at an amount of at most 400 wt % from the weight of the base sheet and to disperse in excess water if the amount of the water exceeds 500 wt %.

12 Claims, 3 Drawing Sheets

Related U.S. Application Data a continuation-in-part of application No. 16/695,317, filed on Nov. 26, 2019, now abandoned.

(60) Provisional application No. 62/811,623, filed on Feb. 28, 2019.

(51) Int. Cl.

| | |
|---|---|
| ***D04H 1/587*** | (2012.01) |
| ***D04H 1/732*** | (2012.01) |
| ***D21H 27/00*** | (2006.01) |

(56) References Cited

U.S. PATENT DOCUMENTS

| | | | |
|---|---|---|---|
| 2009/0233072 | A1 | 9/2009 | Harvey et al. |
| 2011/0293931 | A1 | 12/2011 | Vogel et al. |
| 2014/0259484 | A1 | 9/2014 | Baer et al. |

FOREIGN PATENT DOCUMENTS

| | | |
|---|---|---|
| WO | WO 2012/138552 | 10/2012 |
| WO | WO 2014/091413 | 6/2014 |
| WO | WO 2015/156713 | 10/2015 |
| WO | WO 2016/185332 | 11/2016 |

OTHER PUBLICATIONS

International Search Report for PCT Application No. PCT/IL2020/050217, mailed on Jun. 26, 2020.

Office Action for U.S. Appl. No. 16/695,317, mailed on Feb. 20, 2020.

DISPERSIBLE WIPES REINFORCED WITH A BINDING AGENT

CROSS-REFERENCE TO RELATED APPLICATIONS

This application is a Continuation of International Patent Application No. PCT/IL2020/0502217 filed on Feb. 26, 2020, which claims the benefit of US Provisional Patent Application No. 62/811,623 filed on Feb. 28, 2019 and is a Continuation in Part of U.S. patent application Ser. No. 16/695,317 filed on Nov. 26, 2019, which in turn claims the benefit of U.S. Provisional Patent Application No. 62/811, 623 filed on Feb. 28, 2019, all of which are incorporated herein by reference in their entireties.

FIELD OF THE INVENTION

The present invention generally relates to dispersible wipes. More particularly, the present invention relates to dispersible wipes reinforced with a binding agent.

BACKGROUND OF THE INVENTION

Dispersible wipes or flushable wipes are wet wipes that may be thrown away into the sewage system to be dispersed (i.e., broken down) after being submerged in a large amount of water. Commonly used flushable wipes are made from cellulose pulp fibers similar to those used in conventional toilet paper. However, because cellulose pulp fibers tend to disintegrate and disperse very easily in watery environments, they are too weak (e.g., have low tensile strength) when wetted with a conventional wet wipe lotion, such that they cannot be pulled out from a package. Alternatively, if strongly bonded using conventional means, the commercial flushable wipes are too strong to disperse properly in the sewage system, thus may block a domestic sewage system such that they are practically non-flushable.

Accordingly, there is a need for wet flushable/dispersible wipes that have the required strength to be pulled out from a package when wet with a wipe lotion and are fully dispersible in the presence of excess water, as in the sewage system.

SUMMARY OF THE INVENTION

Some aspects of the present invention may be related to a wet wipe, for example, a dispersible wet wipe. In some embodiments, the wet wipe may include a base sheet comprising short length fibers; a dispersible binding agent reinforcing the base sheet; and a wetting lotion. In some embodiments, the dispersible binding agent may be configured to bind the fibers of the base sheet when the dispersible wipe includes liquid at an amount of at most 400 wt % from the weight of the base sheet and to disperse in excess water if the amount of the water exceeds 500 wt %.

In some embodiments, the dispersible binding agent is a non-adhesive agent. In some embodiments, the non-adhesive agent is selected from: microfibrillar cellulose fibers, nano crystalline cellulose fibrils, microfibrillated cellulose, nanofibrillated cellulose, nanocellulose crystals and the like. In some embodiments, the dispersible binding agent is an adhesive emulsion. In some embodiments, the adhesive emulsion is selected from: Vinyl Acetate based emulsion, Acrylic terpolymer emulsions and the like.

In some embodiments, the dispersible binding agent is present in an amount of 0.5-5 gram/square meter (gsm). In some embodiments, the dispersible binding agent is present in an amount of 1-2 gsm.

In some embodiments, the base sheet is a nonwoven sheet made from short length fibers. In some embodiments, the reinforced base sheet is comprised of fibers of a denier of no more than 5.0. In some embodiments, the short length fibers include at least one of: bi-lobal (ribbon cross section) viscose, lyocell rayon polylactic acid (PLA) polymer fibers, cotton fibers, wood pulp, and the like. In some embodiments, the base sheet may have a weight of 30-100 gsm. In some embodiments, the base sheet may have a weight of 50-70 gsm.

In some embodiments, the short length fibers have maximum length of at most 15 mm. In some embodiments, the diameters of the short length fibers are between 15 and 80 microns. In some embodiments, the wetting lotion may include: water, alcohol, acetone, perfume, reagent, soap, emulsifier, pigment, rheology modifier, aromatic oil, friction reduction agent and any combination thereof.

In some embodiments, the wet wipe may have a tensile strength of between 100 and 250 gm force/inch when the amount of wetting lotion added is 300 wt % from the weight of the base sheet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
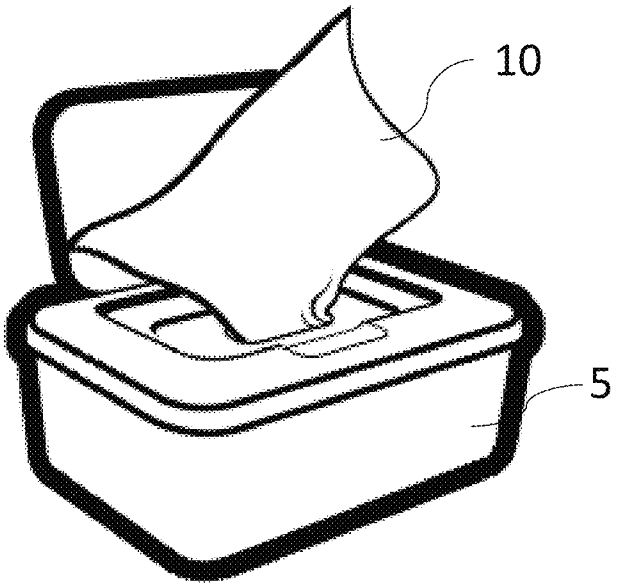
FIG. 1 shows an illustration of a wipe dispenser according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Some aspects of the invention may be related to wet wipes that are fully dispersible in sewage water but still strong enough to be pulled out from a package in an everyday use. Packages of wet wipes according to embodiments of the invention may have shelf life longer than 1 year (e.g., 1.5 years, 2 years and more), during which the packed wet wipes may not lose their mechanical strength. Such wipes when used and thrown into the sewage system may be fully dispersed in typically less than one hour.

Reference is made to FIG. 1, which is an illusration of a wipe dispenser 5 that may include a plurality (e.g., 100) of wipes 10 according to some embodiments of the invention. In some embodiments, wipe dispenser 5 may have shelf life longer than 1 year (e.g., 1.5 years, 2 years and more), during which packed wet wipes 10 may not lose their mechanical strength. In some embodiments, wipe dispenser 5 may allow the dispensing/pulling out of a single wipe 10, each time, using any known method or configuration. For example, wipe dispenser 5 may be a single sheet wipe dispenser, roll control center-feed wipe dispenser, multifold wipes dispenser, and the like.

Figure 2:
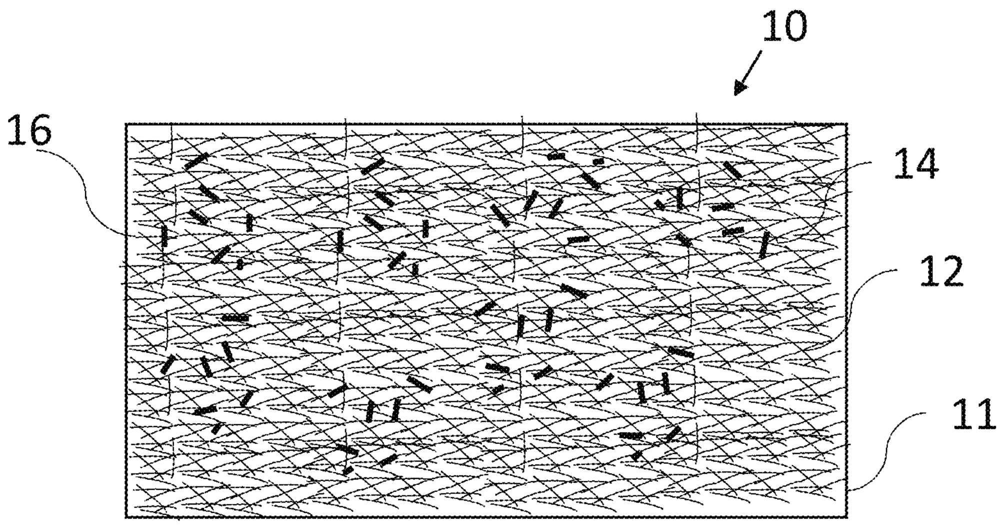
FIG. 2 is an illusration of a structure of a wipe according to some embodiments of the invention.

The structure of a wipe 10 according to some embodiments of the invention is better understood from the illustration in FIG. 2. Wipe 10 may include a base sheet 11 including short length fibers 12 and a dispersible binding agent 14 reinforcing base sheet 11. In some embodiments, wipe 10 may be wet with a wetting lotion 16. In some embodiments, dispersible binding agent 14 may be configured to bind short length fibers 12 of base sheet 11 when dispersible wipe 10 contains liquid at an amount of at most 400 wt. % from the weight of base sheet 11 and to disperse in excess water if the amount of the water exceeds 500 wt. % from the weight of base sheet 11.

In some embodiments, base sheet 11 may be a nonwoven sheet made from short length fibers 12 (e.g., dispersible fibers). As used herein, short length fibers may be defined as fibers having a length of no more than 15 mm. Therefore, short length fibers 12 may include synthetic and/or natural polymeric fibers, having a length of no more than 15 mm, for example, less than 14 mm, less than 13 mm, less than 12 mm or less, in cut length. In some embodiments, the length of short length fibers 12 may at least 4 mm, for example, at least 5 mm, 6 mm or more. In embodiments, short length fibers may be in a range from 4 mm to 15 mm. In some embodiments, fibers having a length of no more than 15 mm may allow good dispersibility of the fibers in sewage water. In some embodiments, fibers 12 may be capable of being wet or dry and formed into nonwoven sheet 11. In some embodiments, short length fibers may include dispersible fibers. As used herein, dispersible fibers may include any fiber materials which are dispersible, biodegradable and/or generally recognized as safe (GRAS). In some embodiments, short length fibers may include raw materials that may be composted or will degrade in the sewage active sludge process. For example, short length fibers 12 may be, at least one of: bi-lobal (ribbon cross section) viscose and/or lyocell rayon polylactic acid (PLA) polymer fibers (e.g., of less than 12 mm in length), cotton fibers (e.g., of less than 3 mm length), wood pulp (e.g., of less than 2.5 mm length) and the like. In some embodiments, base sheet 11 may include more than one type of fiber, for example, cotton fibers and wood pulp. In some embodiments, the denier of fibers may be no more than 5.0, for example, 2.0. In some embodiments, the total weight of base sheet 10 may be 30-100 gram/square meter (gsm), for example, between 50-75 gsm. In some embodiments, the diameters of fibers 12 may be between 15 and 80 microns, for example, between 25 and 50 microns.

In some embodiments, dispersible binding agent 14 may include any material capable of increasing the adhesion between short length fibers 12 when base sheet 11 is wet with wetting lotion 16. In some embodiments, dispersible binding agent 14 may be configured to disperse and/or dissolve in water when wipe 10 is flushed into the sewage system. In some embodiments, dispersible binding agent 14 may include any binding material which is dispersible, biodegradable and/or generally recognized as safe (GRAS). In some embodiments, dispersible binding agent 14 may be added at an amount of 0.5-5 gsm, for example, 0.5-10 wt. % from the total dry weight of base sheet 11 reinforced with binding agent 14. In some embodiments, dispersible binding agent 14 may be added at an amount of 1-2 gsm, for example, 1-4 wt. % from the total dry weight of base sheet 11 reinforced with binding agent 14.

In some embodiments, dispersible binding agent 14 may be a non-adhesive agent. In some embodiments, the non-adhesive agent may be selected from: microfibrillar cellulose fibers, nano crystalline cellulose fibrils, microfibrillated cellulose, nanofibrillated cellulose, nanocellulose crystals and the like. In some embodiments, binding agent 14 may include an adhesive emulsion, for example, Vinyl acetate based aqueous emulsion, Acrylic terpolymer emulsions and the like. In some embodiments, the total dry weight of the reinforced base sheet may be 35-105 gsm, for example, 50-75 gsm.

In some embodiments, wetting lotion 16 may be any lotion known in the art, for example, a lotion composition for a skin cleaning wipe may include: water, a wetting agent/soap and a rheology modifier and/or a friction reducing agent, to create a gliding feeling, complementary emollients, emulsifiers, and preservatives are also added. In some embodiments, the wetting lotion may include: water, alcohol, acetone, perfume, reagent, soap, emulsifier, pigment, rheology modifier, aromatic oil, friction reduction agent and any combination thereof. In some embodiments, dispersible wet wipe 10 may contain wetting lotion at an amount of at most 400 wt. % from the weight of base sheet 11, for example, at an amount of 300 wt. % from the weight of base sheet 11.

In some embodiments, the tensile strength of wet wipe 10 may between 100 to 250 gm force/inch when the amount of wetting lotion added is 300 wt % from the weight of the base sheet. The tensile test measurements were conducted using Instron Model 1122. Sample test strips were cut to dimensions of 2×6 inches with the length perpendicular to the non-woven elongation lines. Each test piece was weighed prior to tensile testing. Tensile testing was made with an elongation speed of 12 inches per minute, jaw separation 4 inches. 6 replicate measurements were made per sample. 6 samples are weighed then placed in a tray containing 300 wt. % their weight in a water solution with 1% dishwashing soap. Petri dish covers with 100 gsm weights were placed on top of the wetted stack of samples and left standing for 5 minutes. Tensile testing proceeded as above with the sample test pieces weighed post soaking to check how much water was absorbed.

In some embodiments, when dispersible wipe 10 is further wet with water, for example, while flushed into the sewage system, the amount of water dissolved by wipe 10 may exceed 500 wt. % from the weight of base sheet 11. In such conditions, binding agent 14 may be dissolved/dispersed in the excess water, thus allowing dispersible fibers 12 of base sheet 11 to be fully dispersed in the excess water. For example, about 60 wt. % of wet wipe 10 may be dispersed in excess water already after 30 minutes.

Flushability testing was conducted according to Guidelines for Assessing Flushability of Disposable Nonwoven Products, INDA and EDANA (May 2018). About 0.6 grams of wipes according to embodiments of the invention were cut as large rectangular pieces and were added to 125 milliliters of water in a flask. The wipes were agitated with a lab wrist action shaker for 2 minutes. The flask contents were then poured into a 5/16th mesh (8 mm) screen and the retained contents dried at 105° C. and equilibrated to 50% RH (relative humidity) and weight.

The Flushability was calculated using equation 1:

% Flushability=[1-(Original sample weight−flushed sample weight)/original sample weight]×100.

The samples were made from a base sheet that includes about 20 wt. % bi-lobal (ribbon cross section) viscose, 50 weight % cotton fibers and 30 wt. % wood pulp reinforced with microfibrillar cellulose fibers. The flushability of the samples were varied from 0-30%.

Figure 3A:
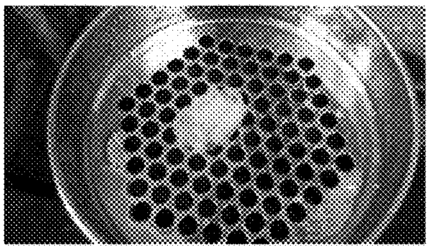
FIGS. 3A and 3B are images taken during a flushability test conducted according to some embodiments of the invention.
Figure 3B:
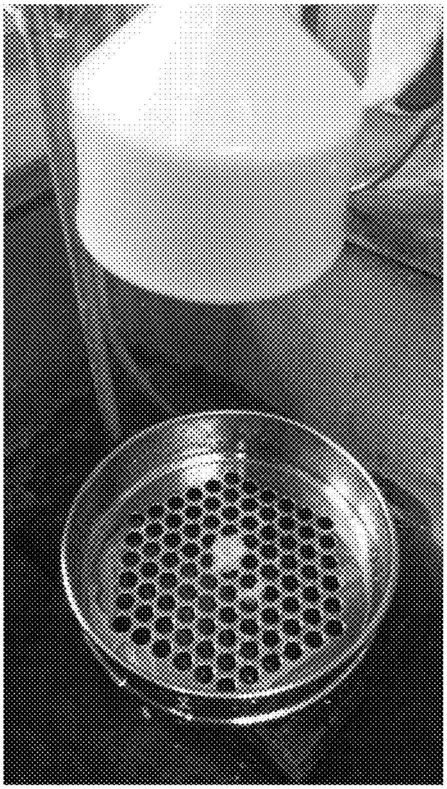

Reference is now made to FIGS. 3A and 3B which shows images taken during a flushability test according to some embodiments of the invention. FIG. 3A shows the wipe sample at the beginning of the flushability test and FIG. 3B what left from the wipe at the end of the flushability test. As would have been clear to one skilled in the art, a longer flushability test will result in complete disintegration of the test wipe.

Figure 4:
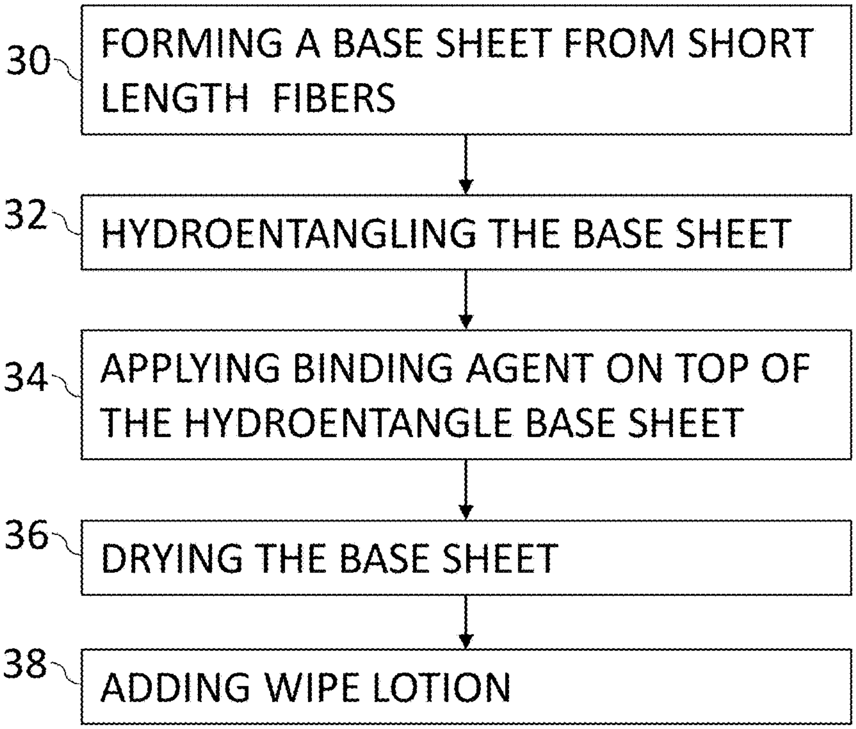
FIG. 4 is a flowchart of a method of making a wet wipe according to some embodiments of the invention.

Reference is now made to FIG. 4 which shows a flowchart of a method of making a wet wipe according to some embodiments of the invention. In box 30, a base sheet may be formed using the short length fibers. For example, short length fibers 12 may be processed using any known paper machine. In box 32, base sheet may be hydroentangled using, for example, low energy hydroentanglement and standard HE (hydroentangled) water needling technique. The energy used may be less than 500 PSI, for example, 250 PSI.

In box 34, a binding agent may be applied on top of the hydroentangled base sheet. For example, binding agent 14 may be sprayed, printed, etc. on top of hydroentangled base sheet 11 in order to reinforce the adhesion between fibers 12 of base sheet 11. In box 36, the reinforce base sheet may be dried using any known method, for example, by air impingement or convection heating methods. In box 38, at most 400 wt. % of a wetting lotion may be added to the reinforced base sheet. For example, 300 wt. % (e.g., 3 times the weight of the dried reinforced base sheet) of lotion may be soaked into the reinforced base sheet, to form the wet wipe.

In some embodiments, the wet wipe may further be packed in a packed inside a wipe dispenser, for example, wipe dispenser 5.

Figure 5:
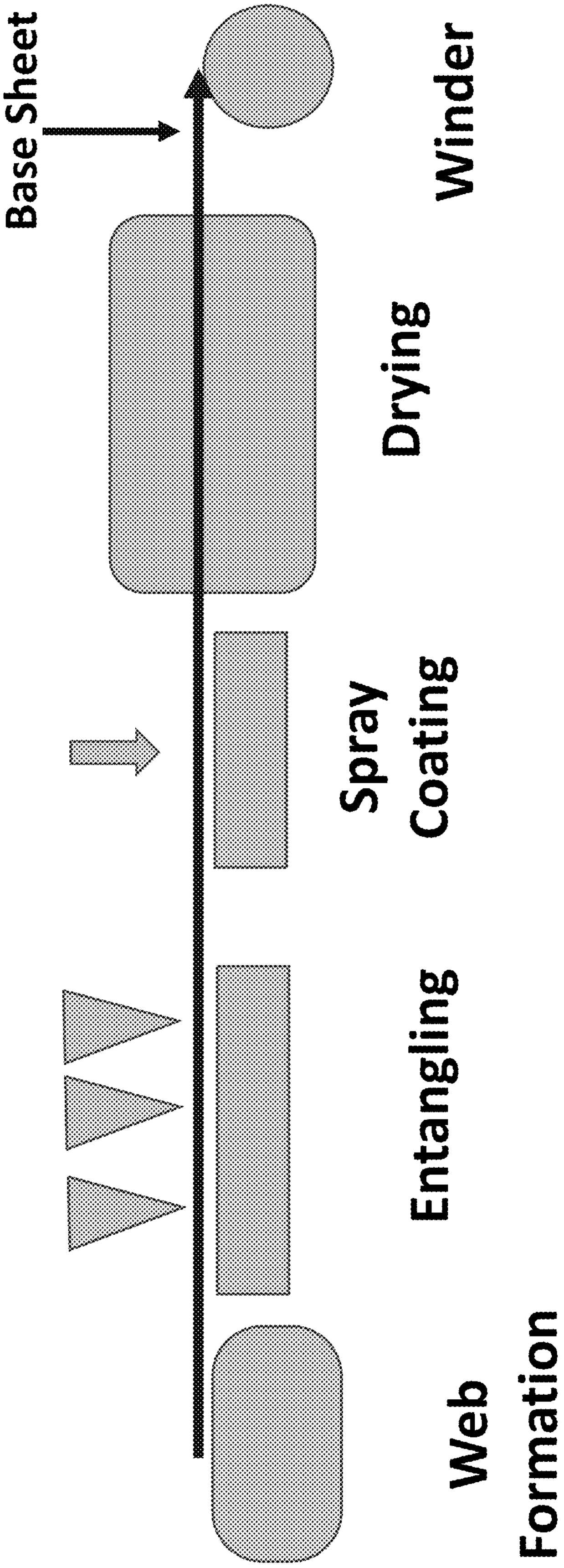
FIG. 5 is a flowchart of a method of making a wet wipe according to other embodiments of the invention.

Reference is now made to FIG. 5 which shows an aspect of the method of making a wet wipe according to some embodiments of the invention. In order to increase the wet strength of the wiper sheet, MicroFibrillar Cellulose (MFC) may added to the surface of the sheet to increase hydrogen bonding. The MFC may typically added at approximately 3% by weight to the sheet. Usually less than 10%. For a standard weight wipe of 65 gsm this is approximately 2 gsm of coat weight.

In accordance with some embodiments of the present invention, the MFC may be sprayed on one or both sides of the sheet, or indeed coated by other means such as slot coating/Meyer rod etc. The coating may be added following the sheet formation and entangling process as shown in FIG. 5. The MFC is typically coated from a dispersion of the MFC in water at 1-2% solids.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A wet wipe comprising:

a base sheet comprising short length fibers, wherein the short length fibers have maximum length of at most 15 mm;

wherein the base sheet is a hydroentangled base sheet;

a dispersible binding agent reinforcing the base sheet, wherein the dispersible binding agent is a non-adhesive agent selected from: microfibrillar cellulose fibers, nano crystalline cellulose fibrils, microfibrillated cellulose (MFC), nanofibrillated cellulose, and nanocellulose crystals;

a wetting lotion, and an MFC layer added to the surface of the base sheet following the base sheet formation and entangling process, wherein the dispersible binding agent is configured to bind the fibers of the base sheet when the dispersible wiper comprises liquid at an amount of at most 500 wt %, from the weight of the base sheet and to disperse in excess water if the amount of the water exceeds 500 wt %, and the dispersible binding agent is present in an amount of 0.5-5 gram/square meter (gsm).

2. The wet wipe of claim 1, the dispersible binding agent is in an amount of 1-2 gsm.

3. The wet wipe of claim 1, wherein the reinforced base sheet is comprised of fibers of a denier of no more than 5.0.

4. The wet wipe of claim 1, wherein the short length fibers comprise at least one of: bi-lobal (ribbon cross section) viscose, lyocell rayon polylactic acid (PLA) polymer fibers, cotton fibers and wood pulp.

5. The wet wipe of claim 1, wherein the base sheet has a weight of 30-100 gsm.

6. The wet wipe of claim 1, wherein the base sheet has a weight of 50-70 gsm.

7. The wet wipe of claim 1, wherein the diameters of the short length fibers are between 15 and 80 microns.

8. The wet wipe of claim 1, having a tensile strength of between 100 and 250 gm force/inch when the amount of wetting lotion added is 300 wt % from the weight of the base sheet.

9. The wet wipe of claim 1, wherein the wetting lotion includes at least one component selected from the group consisting of: water, alcohol, acetone, perfume, reagent, soap, emulsifier, pigment, rheology modifier, aromatic oil, friction reduction agent and any combination thereof.

10. The wet wipe of claim 1, wherein the MFC layer is approximately 3% by weight of the base sheet.

11. The wet wipe of claim 1, wherein the MFC is sprayed on one or both sides of the base sheet or coated by other means.

12. A wet wipe comprising: a base sheet comprising short length fibers, wherein the short length fibers have maximum length of at most 15 mm; wherein the base sheet is a hydroentangled base sheet; a dispersible binding agent reinforcing the base sheet, wherein the dispersible binding agent is a non-adhesive agent selected from: microfibrillar cellulose fibers, nano crystalline cellulose fibrils, microfibrillated cellulose (MFC), nanofibrillated cellulose, and nanocellulose crystals; a wetting lotion, and an MFC layer added to the surface of the base sheet following the base sheet formation and entangling process, wherein the dispersible binding agent is configured to bind the fibers of the base sheet when the dispersible wiper comprises liquid at an amount of at most 400 wt % from the weight of the base sheet and to disperse in excess water if the amount of the water exceeds 500 wt %, and wherein the MFC content is approximately 3% by weight of the base sheet, and the dispersible binding agent is present in an amount of 0.5-5 gram/square meter (gsm).

* * * * *